(12) United States Patent
Li et al.

(10) Patent No.: US 7,789,691 B2
(45) Date of Patent: Sep. 7, 2010

(54) CHIP CARD RETAINING MECHANISM AND PRINTED CIRCUIT BOARD MODULE INCORPORATING SAME

(75) Inventors: Han-Yu Li, Taipei County (TW); Hung-Chuan Wen, Taipei County (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 2 days.

(21) Appl. No.: 12/347,230

(22) Filed: Dec. 31, 2008

(65) Prior Publication Data
US 2009/0305541 A1    Dec. 10, 2009

(30) Foreign Application Priority Data
Jun. 4, 2008    (CN) .......................... 2008 1 0301968

(51) Int. Cl.
*H01R 13/62* (2006.01)
(52) U.S. Cl. ...................................... 439/325
(58) Field of Classification Search ................ 439/325, 439/630, 64, 327–328, 159, 367, 946
See application file for complete search history.

(56) References Cited

U.S. PATENT DOCUMENTS

| | | | |
|---|---|---|---|
| 6,219,231 B1 * | 4/2001 | Nabetani et al. | 361/679.32 |
| 6,540,560 B1 * | 4/2003 | Ito et al. | 439/633 |
| 7,029,297 B1 * | 4/2006 | Co et al. | 439/152 |
| 7,094,106 B2 * | 8/2006 | Yamamoto et al. | 439/630 |
| 7,314,389 B1 * | 1/2008 | Yu et al. | 439/630 |
| 7,431,618 B2 * | 10/2008 | Jin | 439/630 |

* cited by examiner

*Primary Examiner*—Jean F Deverne
(74) *Attorney, Agent, or Firm*—D. Austin Bonderer

(57) ABSTRACT

A chip card retaining mechanism includes a first holding frame, a second holding frame and a circuitry. The first holding frame includes a latching portion and a connecting board. The latching portion defines a first receiving room for receiving a first chip card. The second holding frame is attached to the connecting board of the first holding frame, and is perpendicular to the latching portion of the first holding frame. The second holding frame defines a second receiving room for receiving a second chip card. The circuitry is formed on the connecting board and the latching portion. The first chip card is electronically connected to the second chip card via the circuitry.

15 Claims, 5 Drawing Sheets

CHIP CARD RETAINING MECHANISM AND PRINTED CIRCUIT BOARD MODULE INCORPORATING SAME

BACKGROUND

1. Technical Field

The present disclosure relates to retaining mechanisms and, particularly, to a chip card retaining mechanism and a printed circuit board module incorporating the chip card retaining mechanism.

2. Description of Related Art

Portable electronic devices, such as mobile phones, generally use chip cards to store information. For example, a SIM (subscriber identification module) card is used to contain personal information for a subscriber of a mobile phone network. With the development of technology, portable electronic devices now come with more and more functions, which need a large memory to support. However, many portable electronic devices usually incorporate an embedded memory having a relative small amount of available storage space, which may not satisfy users. Thus, a removable plug-in memory expansion card, such as a TF (TransFlash) card, is sometimes applied to portable electronic device to provide extra storage space for the portable electronic device. Conventionally, the SIM card and the expansion card are placed on a printed circuit card of the portable electronic device, and are electronically connected to each other via circuitry. However, this may occupy too much area for the printed circuit board.

Therefore, there is need for improvement within the art.

BRIEF DESCRIPTION OF THE DRAWINGS

Many aspects of a chip card retaining mechanism and a printed circuit board module incorporating same can be better understood with reference to the following drawings. The components in the drawings are not necessarily drawn to scale, the emphasis instead being placed upon clearly illustrating the principles of the present chip card retaining mechanism and printed circuit board module, in which.

DETAILED DESCRIPTION OF THE EMBODIMENTS

Figure 1:
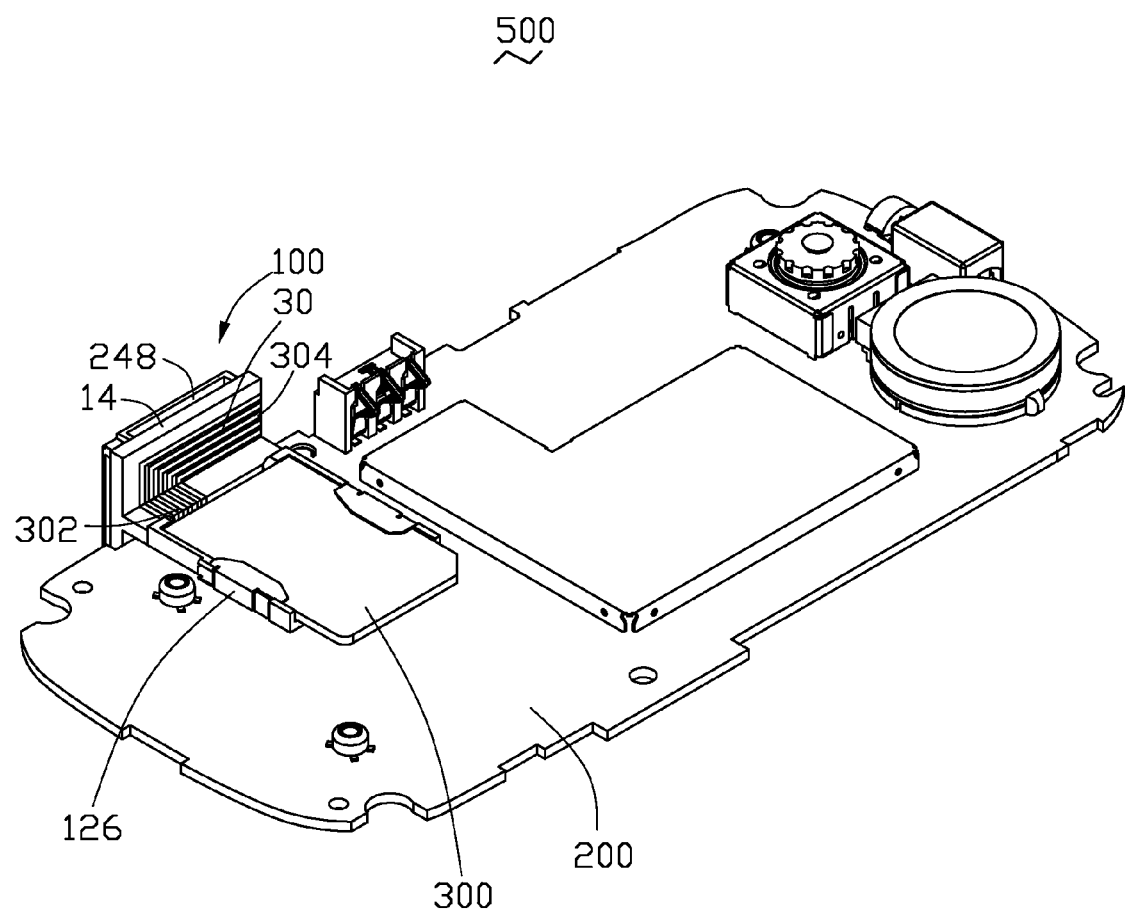
FIG. 1 is an assembled, isometric view of a printed circuit board module, showing a chip card retaining mechanism mounted on a printed circuit board, in accordance with an exemplary embodiment, with a first chip card received in the card retaining mechanism.
Figure 2:
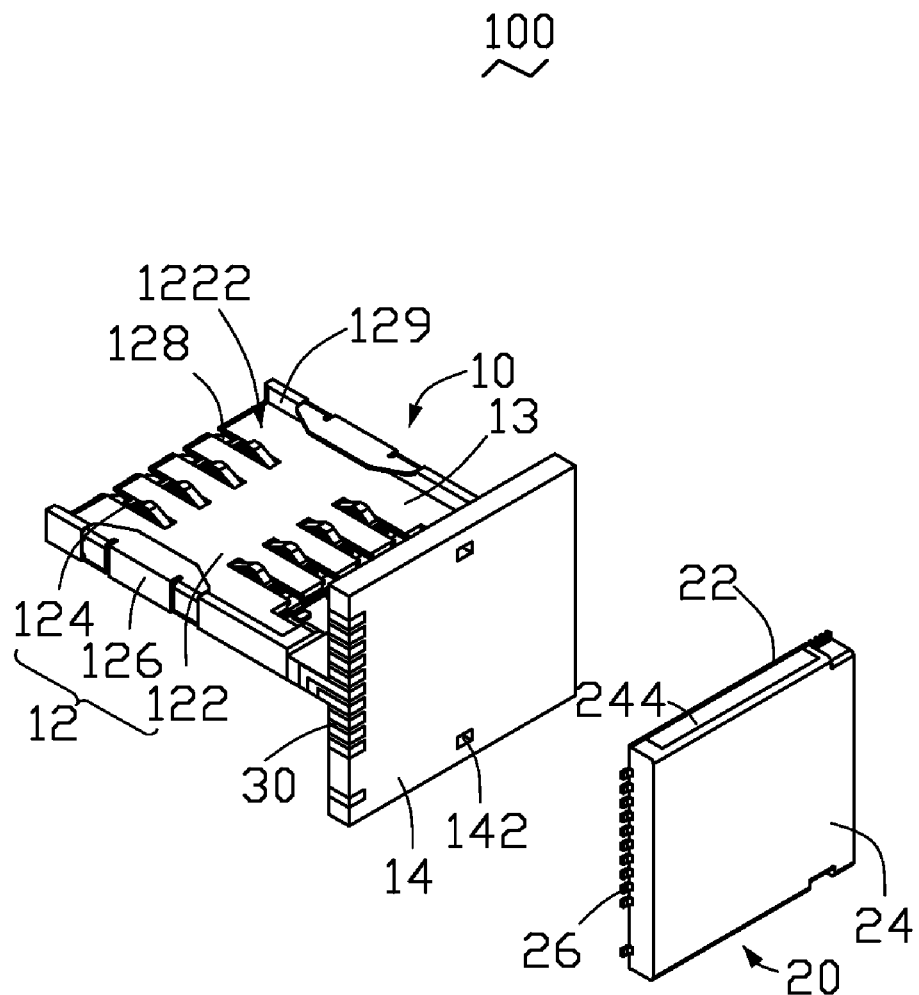
FIG. 2 is an exploded, isometric view of the chip card retaining mechanism shown in FIG. 1, without employing the first chip card.

Referring to FIGS. 1 and 2, a printed circuit board (PCB) module 500 includes a chip card retaining mechanism 100 and a PCB 200, in accordance with an exemplary embodiment. The chip card retaining mechanism 100 is mounted on the PCB 200. The chip card retaining mechanism 100 includes a first holding frame 10 for holding a first chip card 300, a second holding frame 20 for holding a second chip card 400 (referring to FIG. 4), and a circuit 30.

Figure 3:
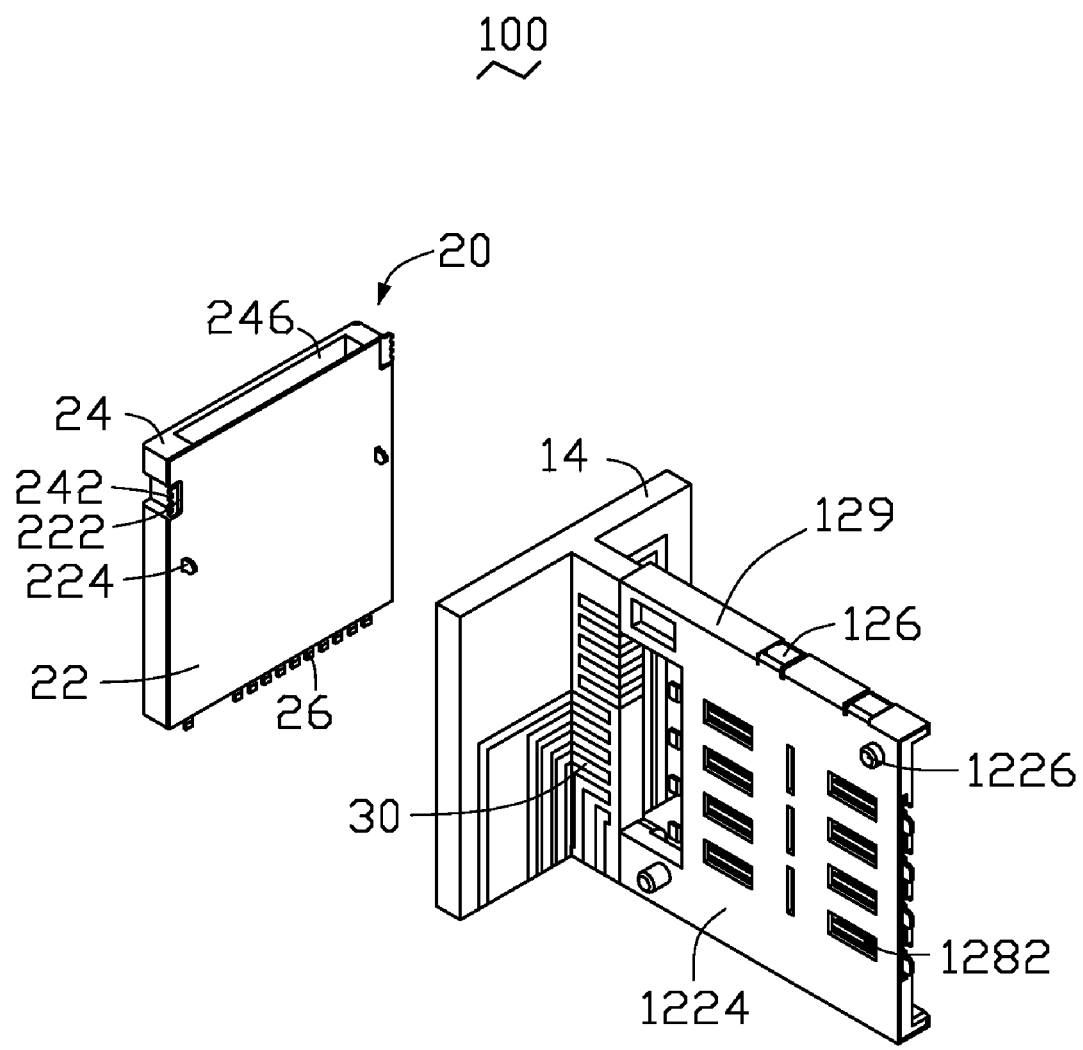
FIG. 3 is similar to FIG. 2, but showing the retaining mechanism from another aspect.

Referring to FIGS. 2 and 3, the first holding frame 10 includes a latching portion 12 and a connecting board 14. The latching portion 12 includes a main board 122, a plurality of connectors 124, and two locking members 126. The main board 122 is rectangular, and has an upper surface 1222 and a lower surface 1224. Two sidewalls 129 extend from the upper surface 1222 of the main board 122, and are positioned at opposite sides of the main board 122. A plurality of rectangular recesses 128 is defined in the upper surface 1222 of the main board 122. Each recess 128 has a bottom surface (not shown), and a groove 1282 defined in the bottom surface. The grooves 1282 extend through the lower surface 1224 of the main board 122. The connectors 124 are flexible bent metal pieces. Each connector 124 extends through a corresponding groove 1282 and projects from a corresponding recess 128. The locking members 126 are metal pieces, and are respectively mounted on the two sidewalls 129. Each locking member 126 includes a wing 1262 (shown in FIG. 4). The two wings 1262 extend toward each other over the main board 122. The upper surface 1222 of the main board 122, the two sidewalls 129, and the wings 1262 of the locking members 126 cooperatively define a first receiving room 13 for receiving the first chip card 300. Two protruding posts 1226 are formed on the lower surface 1224 of the main board 122.

The connecting board 14 is rectangular, and is integrally formed with the main board 122, and perpendicular to the main board 122. Two fixing holes 142 are defined in the connecting board 14, positioned at two sides of the latching portion 12.

The circuit 30 is formed by plating metal on the main board 122 and the connecting board 14, and has a first port 302 and a second port 304 respectively positioned at the main board 122 and the connecting board 14. The first port 302 is electrically connected to the connectors 124 mounted on the main board 122.

The second holding frame 20 includes a bottom board 22 and a cover 24 attached to the bottom board 22. The bottom board 22 and the cover 24 cooperatively define a second receiving room 248 (shown in FIG. 1) for receiving the second chip card 400. A plurality of connectors (not shown) is set in the second receiving room 248 to electrically connect to the second chip card 400. The second receiving room 248 communicates with outside via a first opening 244 and a second opening 246 respectively defined in two sides of the cover 24. The first and second openings 244, 246 are configured for allowing insertion into and removal of the second chip card 400 out of the second receiving room 248. A plurality of pads 26 is positioned at one end of the bottom board 22, opposite to the second opening 246. The pads 26 electrically connect to the connectors in the second receiving room 248, and also are configured to electrically connect with the second port 304 of the circuit 30. Two hooks 224 protrude from the bottom board 22, and are configured for engaging in the fixing holes 142 of the connecting board 14 of the first holding frame 10.

Figure 4:
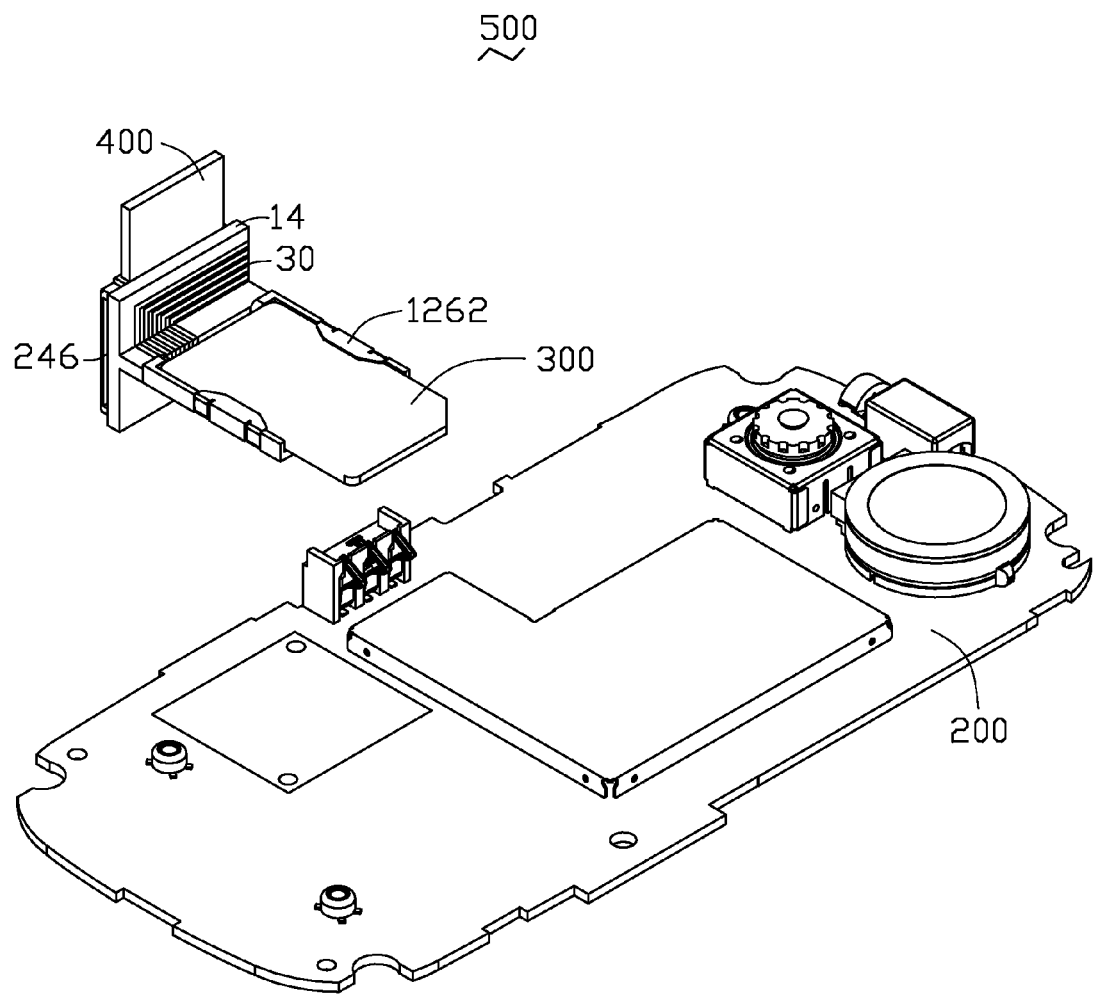
FIG. 4 is similar to FIG. 1, but showing the chip card retaining mechanism disassembled from the printed circuit board, with a second chip card being inserted into the chip card retaining mechanism from one direction.

Referring to FIG. 4, the second holding frame 20 is attached to the first holding frame 10 by engagement of the hooks 224 of the bottom board 22 and the fixing holes 142 of the connecting board 14. The pads 26 of the bottom board 22 electrically contact the second port 304.

Figure 5:
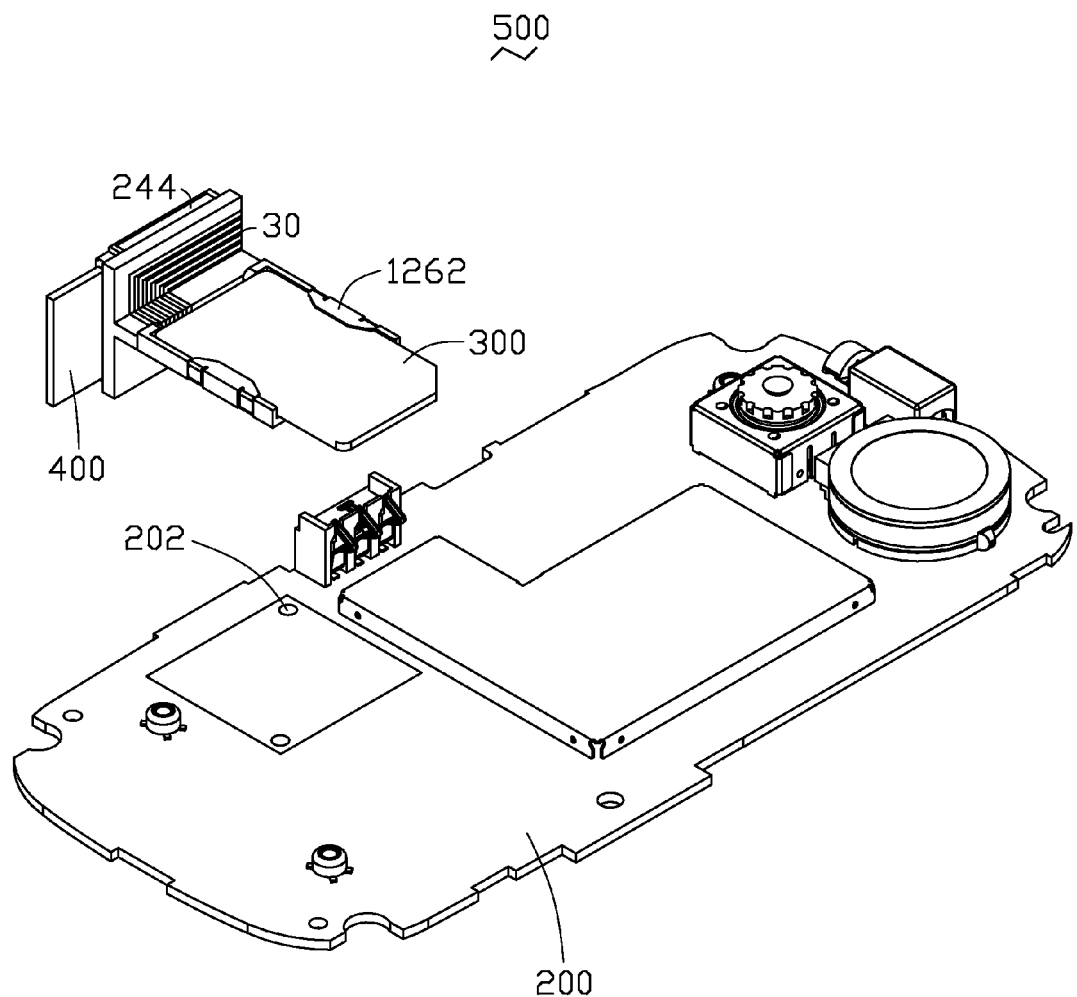
FIG. 5 is similar to FIG. 4, but showing the second chip card being inserted into the second holding frame from another direction.

Referring to FIGS. 1, and 4-5, the PCB 200 defines two securing holes 202, and the chip card retaining mechanism 100 is attached to the PCB 200 by engagement of the protruding posts 1226 of the main board 122 and the securing holes 202 of the PCB 200. The second holding frame 20 is perpendicular to the PCB 200. Thus, the exemplary chip car retaining mechanism 100 occupies less area of the PCB 200 than a conventional chip card retaining mechanism.

In use, the first chip card 300 is received in the first receiving room 13 of the first holding frame 10. The second chip card 400 is inserted into the second receiving room 248 of the second holding frame 20 through the first opening 244 or the second opening 246. The second chip card 400 is electronically connected to the first chip card 300 by the circuit 30, which increases available memory of the electronic device.

It is to be understood that the chip card retaining mechanism 100 may be attached to the PCB 200 by adhesive or welding.

It is to be further understood that the hooks 224 of the bottom board 22 and the fixing holes 142 of the connecting board 14 may be omitted, and the bottom board 22 directly attached to the connecting board 14 by adhesive or welding.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A chip card retaining mechanism comprising:
a first holding frame including a latching portion and a connecting board, the latching portion defining a first receiving room for receiving a first chip card;
a second holding frame attached to the connecting board of the first holding frame, the second holding frame being perpendicular to the latching portion of the first holding frame, and defining a second receiving room for receiving a second chip card; the second chip card in the second receiving room being perpendicular to the first chip card in the first receiving room; and
a circuitry formed on the connecting board and the latching portion, the first chip card being electronically connected to the second chip card via the circuitry.

2. The chip card retaining mechanism as claimed in claim 1, wherein the latching portion comprises a main board and two locking members, two sidewalls extend from the main board, and the locking members are respectively mounted on the sidewalls.

3. The chip card retaining mechanism as claimed in claim 2, wherein the connecting board is perpendicular to the main board.

4. The chip card retaining mechanism as claimed in claim 2, wherein the main board comprises a plurality of recesses for receiving connectors, a through groove is defined in a bottom surface of each of the plurality of recesses allowing the connector to pass through.

5. The chip card retaining mechanism as claimed in claim 1, wherein the second holding frame comprises a cover and a bottom board, the cover and the bottom board cooperatively define the second receiving room.

6. The chip card retaining mechanism as claimed in claim 5, wherein two hooks are formed on the bottom board, and the connecting board of the first holding frame defines two fixing holes, each of the fixing holes corresponding to one of the hooks.

7. The chip card retaining mechanism as claimed in claim 5, wherein a plurality of pads are positioned at one end of the bottom board.

8. The chip card retaining mechanism as claimed in claim 7, wherein the circuitry comprises a first port and a second port, the first port is positioned at the main board, the second port is positioned at the connecting board, and the second port is electrically connected to the pads of the second holding frame.

9. The chip card retaining mechanism as claimed in claim 1, wherein the second holding frame comprises a first opening and a second opening, the second chip card is capable of being inserted into and removed out of the second receiving room via the first and second openings.

10. A chip card retaining mechanism comprising:
a first holding frame defining a first receiving room for receiving a first chip card, the first holding frame including a connecting board, the connecting board defining two fixing holes;
a second holding frame perpendicularly attached to the first holding frame, the second holding defining a second receiving room for receiving a second chip card, the second holding frame including a bottom board, two hooks being formed on the bottom board and each hook being engaged in a corresponding fixing hole; and
a circuitry formed on the first holding frame, the first chip card being electronically connected to the second chip card via the circuitry.

11. The chip card retaining mechanism as claimed in claim 10, wherein the first holding frame comprises a latching portion, the first receiving room is defined in the latching portion, and the first receiving room is perpendicular to the second receiving room.

12. The chip card retaining mechanism as claimed in claim 11, wherein the latching portion comprises a main board, the circuitry has a first port and a second port, the first port is positioned at the main board, and the second port is positioned at the connecting board.

13. A printed circuit board module comprising:
a printed circuit board; and
a chip car retaining mechanism attached to the printed circuit boar, including:
a first holding frame defining a first receiving room for receiving a first chip card, the first holding frame being placed on the printed circuit board;
a second holding frame perpendicularly attached to the first holding frame, the second holding frame defining a second receiving room for receiving a second chip card, and being perpendicular to the printed circuit board; and
a circuitry formed on the first holding frame, the first chip card being electronically connected to the second chip card via the circuitry.

14. The printed circuit board module as claimed in claim 13, wherein the first holding frame defines two fixing holes, and two hooks are formed on the second holding frame and are engaged in the two fixing holes correspondingly.

15. The printed circuit board module as claimed in claim 13, wherein the first holding frame comprises a connecting board and a main board vertically extending from the connecting board, the circuitry has a first port and a second port, the first port is positioned at the main board, the second port is positioned at the connecting board, a plurality of pads are formed on the second holding frame, and the second port is electrically connected to the pads of the second holding frame.

* * * * *